US012750797B2

(12) United States Patent
Chau

(10) Patent No.: US 12,750,797 B2
(45) Date of Patent: Sep. 29, 2026

(54) EDGE-ORIGINATED CELLULAR NETWORK TIMING

(71) Applicant: DISH Wireless L.L.C, Littleton, CO (US)

(72) Inventor: Chakavuth C. Chau, Garland, TX (US)

(73) Assignee: DISH Wireless L.L.C., Littleton, CO (US)

( * ) Notice: Subject to any disclaimer, the term of this patent is extended or adjusted under 35 U.S.C. 154(b) by 647 days.

(21) Appl. No.: 17/862,072

(22) Filed: Jul. 11, 2022

(65) Prior Publication Data

US 2024/0015675 A1 Jan. 11, 2024

(51) Int. Cl.
*H04W 56/00* (2009.01)
*H04L 7/00* (2006.01)
*H04L 7/10* (2006.01)

(52) U.S. Cl.
CPC ....... *H04W 56/0015* (2013.01); *H04L 7/0037* (2013.01); *H04L 7/10* (2013.01); *H04W 56/0045* (2013.01)

(58) Field of Classification Search
CPC .......... H04W 56/0015; H04W 56/0045; H04L 7/0037; H04L 7/10; H04J 3/0667; H04J 3/0644
See application file for complete search history.

(56) References Cited

U.S. PATENT DOCUMENTS 6,542,754 B1 4/2003 Sayers et al.
2006/0039347 A1 2/2006 Nakamura et al.
2010/0222063 A1 9/2010 Ishikura et al.
2011/0135047 A1 6/2011 Tournier et al.
2014/0185632 A1 7/2014 Steiner et al.
2015/0208319 A1 7/2015 Kim et al.
2017/0127368 A1* 5/2017 Wang ................ H04W 56/0015
2017/0302392 A1 10/2017 Farra et al.
2018/0124611 A1* 5/2018 Moon ............... H04W 72/0453
2018/0206203 A1* 7/2018 Ruffini ................ H04W 56/002
2019/0116568 A1 4/2019 Fertonani et al.
(Continued)

FOREIGN PATENT DOCUMENTS

JP 2019068301 A 4/2019

OTHER PUBLICATIONS

Telecommunication System for Facilitating Timing Synchronization for Small Cells With Limited Backhaul, Has Synchronizing Network Separate From Backhaul Network and Providing Communication Timing Between Synchronizing System and Port. Document ID US 20170127368 A1 (Year: 2016).*
(Continued)

*Primary Examiner* — Noel R Beharry
(74) *Attorney, Agent, or Firm* — Kilpatrick Townsend & Stockton LLP

(57) ABSTRACT

Various arrangements for generating and distributing a grandmaster timing signal for a cellular network are presented herein. A base station can generate a grandmaster clock timing signal based on a signal received by a global navigation satellite system receiver of the base station and a clock signal of a local oscillator of the base station. This grandmaster timing signal may be transmitted to a distributed unit of the base station. This grandmaster timing signal can also be transmitted, via a network, to each base station of a plurality of base stations of the cellular network.

20 Claims, 10 Drawing Sheets

(56) References Cited

U.S. PATENT DOCUMENTS

| | | | |
|---|---|---|---|
| 2020/0077355 | A1 | 3/2020 | Sandberg |
| 2021/0204230 | A1* | 7/2021 | Van Phan ............. H04J 3/0667 |
| 2021/0243839 | A1 | 8/2021 | Krishnaswamy et al. |
| 2022/0268941 | A1* | 8/2022 | Wakamiya ............. G06V 20/58 |
| 2022/0268943 | A1* | 8/2022 | Gomez ................... G01S 19/23 |
| 2022/0317681 | A1 | 10/2022 | Suzuki et al. |

OTHER PUBLICATIONS

"IEEE Standard for a Precision Clock Synchronization Protocol for Networked Measurement and Control Systems, IEEE SA Standards Association, Developed by the Technical Committee on Sensor Technology (TC-9) of the IEEE. Instrumentation and Measurement Society", 2016, 499 pages.

* cited by examiner

EDGE-ORIGINATED CELLULAR NETWORK TIMING

BACKGROUND

Cellular networks are highly complex distributed systems that involve a large number of components that need to communicate with each other. In order to synchronize communications, a clock signal may need to be distributed among components of the cellular network. If the clock signal is not reliable and accurate due loss of synchronization, packet loss can occur or even failure of the cellular network to function.

SUMMARY

Various embodiments are described related to a cellular network timing system. In some embodiments, a cellular network timing system is described. The system may comprise a plurality of base stations. The system may comprise a master base station. The master base station may comprise a radio unit (RU). The master base station may comprise a distributed unit (DU). The master base station may comprise a router in communication with the RU, the DU, and a network. The router may comprise a global navigation satellite system (GNSS) receiver. The router may be configured to generate a grandmaster clock timing signal based on a signal received by the GNSS receiver and a clock signal of a local oscillator. The router may be configured to transmit the grandmaster timing signal to the distributed unit. The router may be configured to transmit, via the network, the grandmaster timing signal to each base station of the plurality of base stations.

Embodiments of such a system may include one or more of the following features: the DU may be configured to synchronize a boundary clock using the grandmaster timing signal created by the router at the master base station. The DU may be executed on a computer server system that may be part of the master base station. The RU may be configured to synchronize a slave clock based on a boundary clock timing signal received from the DU of the master base station. The system may further comprise a regional data center (RDC) in communication with the plurality of base stations and the master base station via the network. The router of the master base station may be further configured to transmit, via the network, the grandmaster timing signal to the RDC. The RDC may be configured to synchronize a RDC boundary clock using the grandmaster timing signal received from the master base station. The master base station may transmit the grandmaster timing signal to the plurality of base stations directly via the network such that no other cellular network components relay the grandmaster timing signal between the master base station and the plurality of base stations. Each base station of the plurality of base stations may synchronize a local boundary clock using the grandmaster timing signal received from the master base station via the network. The grandmaster timing signal may be used to coordinate time, frequency, and phase for the plurality of base stations. The master base station and the plurality of base stations may be part of a 5G New Radio (NR) cellular network.

In some embodiments, a method for generating and distributing a grandmaster timing signal for a cellular network is described. The method may comprise generating, by a base station, a grandmaster clock timing signal based on a signal received by a GNSS receiver of the base station and a clock signal of a local oscillator of the base station. The method may comprise transmitting the grandmaster timing signal to a distributed unit (DU) of the base station. The method may comprise transmitting, via a network, the grandmaster timing signal to each base station of a plurality of base stations of the cellular network.

Embodiments of such a method may include one or more of the following features: the grandmaster clock timing signal may be generated by a router of the base station, the router being communicatively coupled with a radio unit (RU) and the DU of the base station. The method may further comprise synchronizing, by the DU, a boundary clock of the DU using the grandmaster timing signal. The DU may be executed on a computer server system that is part of the base station. The method may further comprise synchronizing, by the RU of the base station, a slave clock based on a boundary clock timing signal received from the DU. The method may further comprise receiving, by a regional data center (RDC) executed on a cloud-computing platform, the grandmaster timing signal from the base station. The method may further comprise synchronizing, by the RDC, an RDC boundary clock using the grandmaster timing signal received from the base station. The base station may transmit the grandmaster timing signal to the plurality of base stations directly via the network such that no other cellular network components relay the grandmaster timing signal between the base station and the plurality of base stations. The method may further comprise synchronizing, by each base station of the plurality of base stations, a local boundary clock using the grandmaster timing signal received from the base station via the network. The grandmaster timing signal may be used to coordinate time, frequency, and phase for the plurality of base stations.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
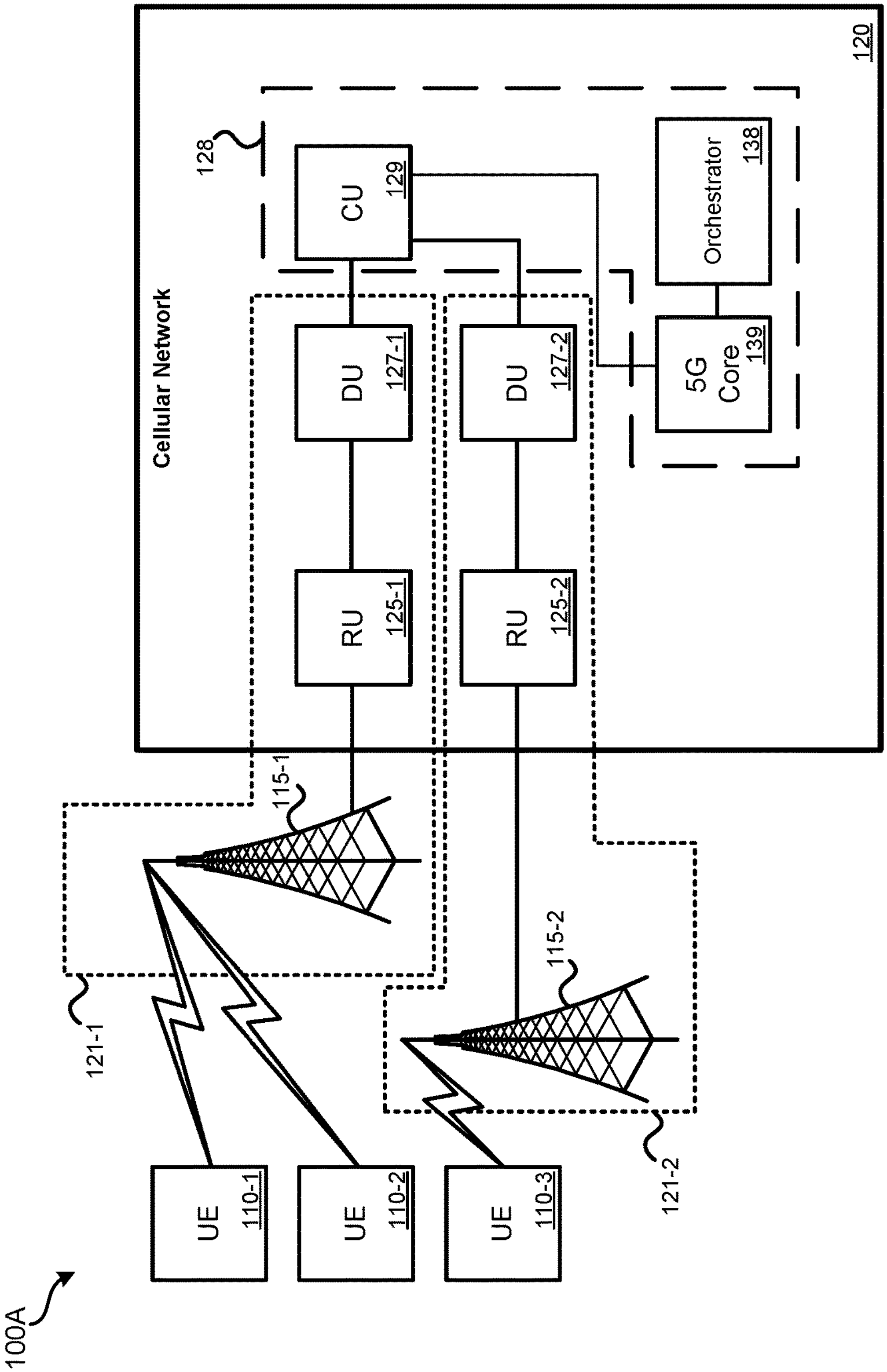
FIG. 1A illustrates an embodiment of a cellular network system.

A base station (BS), which functions as the edge of a cellular network's radio access network (RAN), can serve as the grandmaster timing source for at least a portion of the cellular network. A BS, such as in a 5G New Radio (NR) cellular network, can include various components, such as a radio unit (RU), distributed unit (DU), one or more antennas, and a router. The router may have a global navigation satellite system (GNSS) receiver, such as a global positioning system (GPS) receiver on-board, which allows for a highly precise time to be acquired. The router may be assigned to create a grandmaster (GM) timing signal that is distributed to other components at the BS, at other BSs, and to other components of the cellular network, such as to regional data centers (RDCs).

In 5G NR cellular networks, timing is required to be highly precise. Originating the GM timing signal at a BS allows for various advantages, including the ability to quickly switch to a GM timing signal generated by another BS if a problem is encountered by the previous BS generating the GM timing signal. A 5G NR cellular network can use the precision time protocol (PTP) for synchronizing clocks across all or a portion of the cellular network. For a 5G NR cellular network, time, frequency, and phase of the timing signals needs to be synchronized. Based on the GM timing signal, within a subnet, such as at BS, the GM timing signal can be received and used to synchronize a boundary clock (BC). The BC can then be used locally within the subnet to synchronize one or more additional slave clocks (SCs).

In some embodiments, a "full" BS, which is a base station that includes an on-site distributed unit (DU), can generate a grandmaster timing signal and distribute that timing signal to other base stations and network components, such as a regional data center (RDC). Using the grandmaster timing signal, other base stations and other network components can synchronize a boundary clock, which in turn can be used to synchronize one or more slave clocks.

In other embodiments, a "light" BS is used, which is a base station that does not have an on-site DU, but rather is in communication with a local data center (LDC) which hosts multiple DUs for multiple light BSs. A light BS can generate a grandmaster timing signal and distribute that timing signal to other light (and, possibly, full) base stations and network components, such as the LDC. The LDC may then relay the grandmaster timing signal to an RDC. Using the grandmaster timing signal, other light base stations and other network components can synchronize a boundary clock, which in turn can be used to synchronize one or more slave clocks.

Circumstances can arise in which a BS (full or light) that is serving as the master BS that generates the GM timing signal can no longer perform such generation. For example, the master BS may experience a power outage or may lose the ability to receive the GNSS timing signal (e.g., due to extreme weather). In such a circumstance, a handoff process may occur during which another BS is assigned to be the master BS. This new master BS can then assume the task of distributing the GM timing signal to other BSs and cellular network components.

Figure 1B:
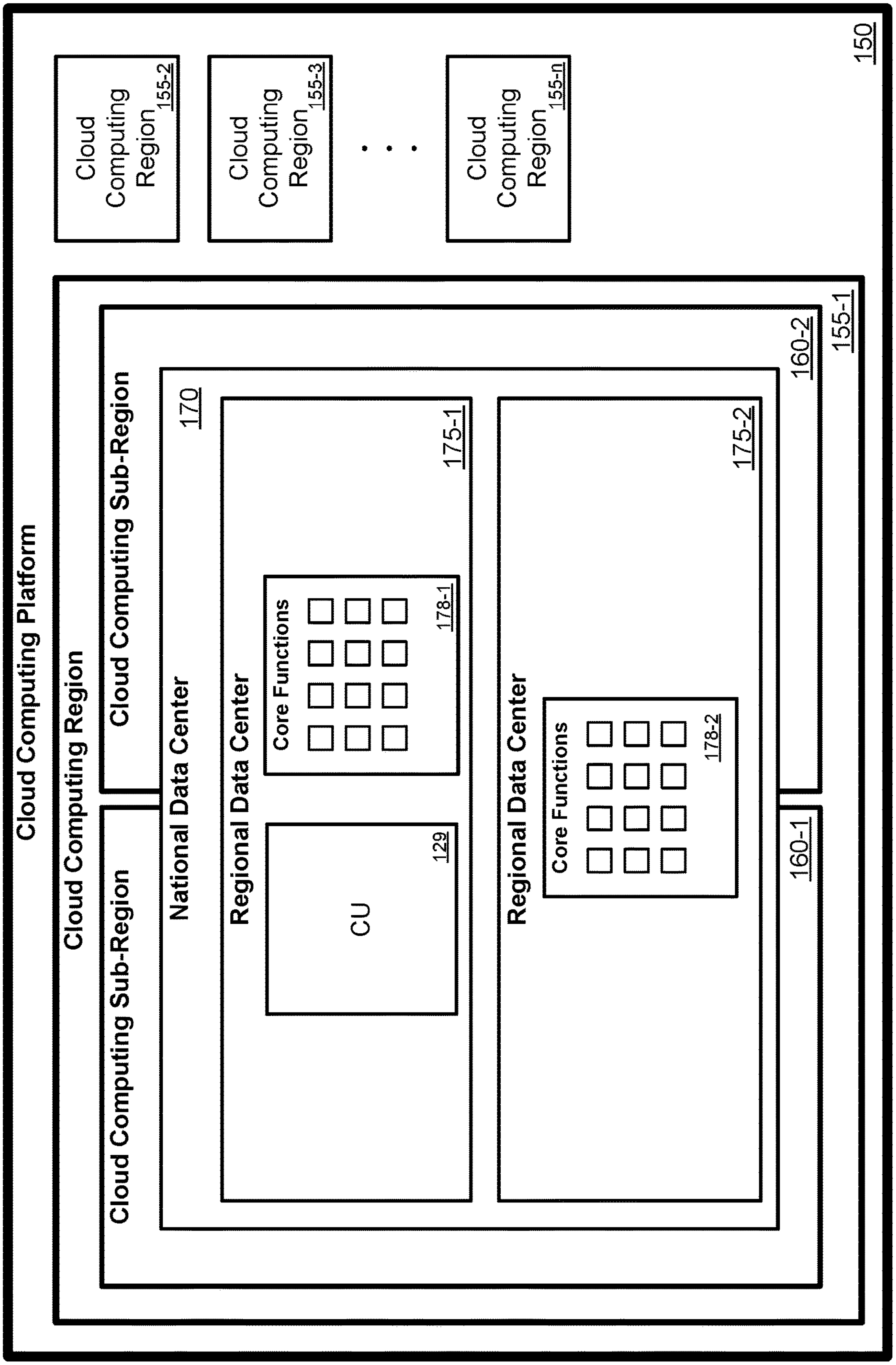
FIG. 1B illustrates an embodiment of a 5G core network topology on a cloud-computing platform.

Further detail regarding these embodiments and additional embodiments is provided in relation to the figures. FIG. 1A illustrates an embodiment of a cellular network system 100 ("system 100"). FIG. 1A represents an embodiment of a cellular network which can accommodate the architecture of FIGS. 1B and 2-4. System 100 can include a 5G New Radio (NR) cellular network; other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139, and orchestrator 138. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed, or a hybrid arrangement which can use an on-premises data center and cloud computing functionality.

UE 110 can represent various types of end-user devices, such as cellular phones, smartphones, cellular modems, cellular-enabled computerized devices, sensor devices, gaming devices, access points (APs), any computerized device capable of communicating via a cellular network, Internet of Things (IoT), etc. Generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, and/or orchestrator 138 can be implemented virtually as software being executed by general-purpose computing equipment, such as in a data center, as detailed herein. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system or on a public or provide cloud computing system. In the illustrated embodiment of system 100, cloud-based cellular network components 128 include CU 129, 5G core 139, and orchestrator 138. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, Docker®, or some other container orchestration platform, can be used to create and destroy the logical CU or 5G core units and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Orchestrator 138 can allow for the instantiation of new cloud-based components of cellular network 120. As an example, to instantiate a new core function, orchestrator 138 can perform a pipeline of calling the core function code from a software repository incorporated as part of, or separate from, cellular network 120; pulling corresponding configuration files (e.g., helm charts); creating Kubernetes nodes/pods; loading the related core function containers; configuring the core function; and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different from the first set, may be reserved at RU 125-2 and DU 127-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

FIG. 1B illustrates an embodiment of a 5G core network topology on cloud computing platform 150. Cloud computing platform 150 can be logically and physically divided up into various different cloud computing regions 155. Each of cloud computing regions can be isolated from other cloud computing regions to help provide fault tolerance and stability. Further, each of cloud computing regions 155 may provide superior service to a particular geographic region based on physical proximity. For example, cloud computing region 155-1 may have its datacenters and hardware located in the northeast of the United States while cloud computing region 155-2 may have its datacenters and hardware located in California. For simplicity, the details of the cellular network as executed in only cloud computing region 155-1 is illustrated. Similar components may be executed in other cloud computing regions of cloud computing regions 155 (155-2, 155-3, 155-*n*).

Each of cloud computing regions 155 may include two or more cloud computing sub-regions 160. Each of cloud computing sub-regions 160 can allow for redundancy that allows for fail-over protection. For example, if a particular cloud computing sub-region experiences an outage, another cloud computing sub-region within the same cloud computing region can continue functioning and providing service. If the cloud computing platform used is Amazon Web Services (AWS), cloud computing sub-regions may be referred to as "availability zones." For example, a database that is maintained as part of NDC 170 may be replicated in each cloud computing sub-region; therefore, if one of cloud computing sub-regions 160 fails, a copy of the database remains up-to-date and available, thus allowing for continuous or near continuous functionality.

In the topology of a 5G NR cellular network, 5G core functions of 5G core 139 can logically reside as part of a national data center (NDC). NDC 170 can be understood as having its functionality existing in multiple (e.g., two, three, or more) cloud computing sub-regions 160 within cloud computing region 155-1. This arrangement allows for load-balancing, redundancy, and fail-over. Within NDC 170, multiple regional data centers 175 can be logically present. Each of regional data centers 175 may execute 5G core functions for a different geographic region or group of RAN components. As an example, 5G core components that can be executed within an RDC, such as RDC 175-1, may be 5G core functions 178-1. Another set of 5G core function 178-2 may be executed within RDC 175-2. In some embodiments, within RDCs, CUs may be present. For example, as illustrated CU 129 is resident within RDC 175-1.

Figure 2:
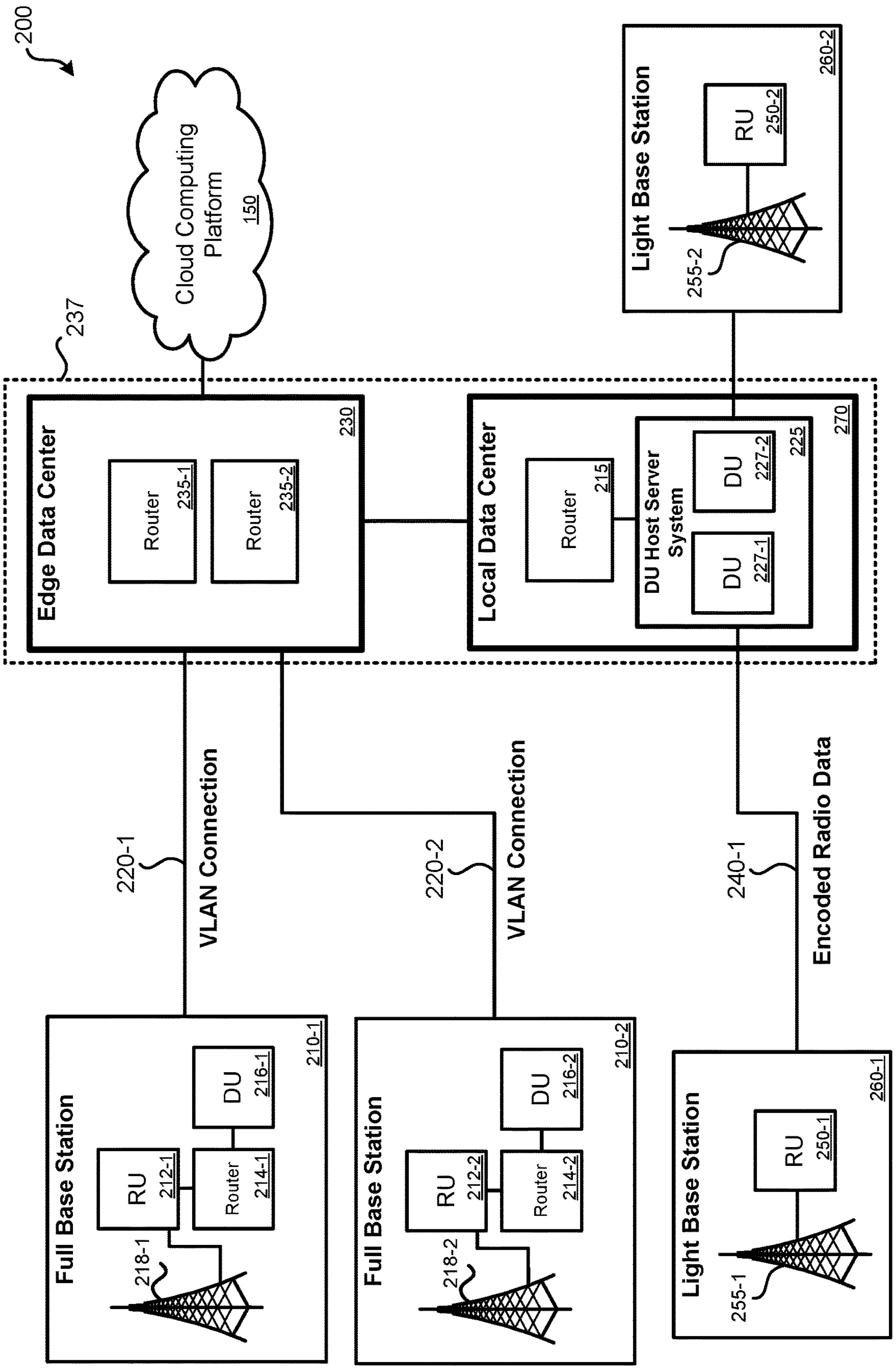
FIG. 2 illustrates an embodiment of a cellular network system that includes hybrid use of local and remote DUs.

FIG. 2 illustrates an embodiment of cellular network system 200 ("system 200") that includes hybrid use of local and remote DUs. System 200 can include: LDC 270; fiber optic connections 240; light BSs 260; full BSs 210; VLAN connections 220; edge data center 230 ("EDC 230"); CU 129; and 5G core 139. In system 200, some base stations, referred to as "full base stations," have DUs implemented locally at each BS. In contrast, a "light base station" includes structure and a local radio unit (e.g., structures 255 and radio units 250), but a DU implemented remotely at a geographically separated LDC.

LDC 270 can serve to host DU host server system 225, which can host multiple DUs 227 which are remote from corresponding light base stations 260. For example, DU 227-1 can perform the DU functionality for light base station 260-1. DUs with DU host server system 225 can communicate with each other as needed.

LDC 270 can be connected with EDC 230. In some embodiments, LDC 270 and EDC 230 may be co-located in a same data center or are relatively near each other, such as within 250 meters. EDC 230 can include multiple routers, such as routers 235, and can serve as a hub for multiple full BSs 210 and one or more LDCs 270. EDC 230 may be so named because it primarily handles the routing of data and does not host any RAN or cellular core functions. In a cloud-computing cellular network implementation at least some components, such as CU 129 and functions of 5G core 139, may be hosted on cloud computing platform 150, as detailed in relation to FIG. 1B. EDC 230 may serve as the past point over which the cellular network operator maintains physical control; higher-level functions of CU 129 and 5G core 139 can be executed in the cloud. In other embodiments, CU 129 and 5G core 139 may be hosted using hardware maintained by the cellular network provider, which may be in the same or a different data center from EDC 230.

Full BSs 210, which include on-site DUs 216, may connect with the cellular network through EDC 230. A full BS, such as full BS 210-1, can include: RU 212-1; router 214-1; DU 216-1; and structure 218-1. Router 214-1 may have a connection to a high bandwidth communication link with EDC 230. Router 214-1 may route data between DU 216-1 and EDC 230 and between DU 216-1 and RU 212-1. In some embodiments, RU 212-1 and one or more antennas are mounted to structure 218-1, while router 214-1 and DU 216-1 are housed at a base of structure 218-1. Full BS 210-2 functions similarly to full BS 210-1. While two full BSs 210 and two light BSs 260 are illustrated in FIG. 2, it should be understood that these numbers of BSs are merely for exemplary purposes; in other embodiments, the number of each type of BS may be greater or fewer.

While encoded radio data is transmitted via the fiber optic connections 240 between light BSs 260 and LDC 270, connection 220-1 between full BSs 210 and EDC 230 may occur over a fiber network. For example, while the connection between light BS 260-1 and LDC 270 can be understood as a dedicated point-to-point communication link on which addressing is not necessary, full BS 210-1 may operate on a fiber network on which addressing is required. Multiprotocol label switching (MPLS) segment routing (SR) may be used to perform routing over a network (e.g., fiber optic network) between full BS 210-1 and EDC 230. Such segment routing can allow for network nodes to steer packetized data based on a list of instructions carried in the packet header. This arrangement allows for the source from where the packet originated to define a route through one or more nodes that will be taken to cause the packet to arrive at its destination. Use of SR can help ensure network performance guarantees and can allow for network resources to be efficiently used. Other full BSs may use the same types of communication link as full BS 210-1. While MPLS SR can be used for the network connection between full BSs 210 and EDC 230, it should be understood that other protocols and non-fiber-based networks can be used for connections 220.

For communications across connection 220-1, since a fiber network that may also be used by other entities is used, a virtual local area network (VLAN) may be established between DU 216-1 and EDC 230. The encryption of this VLAN helps ensure the security of the data transmitted over the fiber network.

Since light BSs 260 are relatively close to LDC 270, typically in a dense urban environment, use of a dedicated point-to-point fiber connection can be relatively straightforward to install or obtain (e.g., from a network provider that has available dark fiber or fiber on which bandwidth can be reserved). However, in a less dense environment, where full BSs 210 can be used, a point-to-point fiber connection may be cost-prohibitive or otherwise unavailable. As such, the fiber network on which MPLS SR is performed and the VLAN connection is established can be used instead. Further, the total amount of upstream and/or downstream data from a light BS to an LDC may be significantly greater than the amount of upstream and/or downstream data from a DU of a full BS to EDC 237, thus requiring a dedicated fiber optic connection to satisfy the bandwidth requirements of light BSs.

Figure 3:
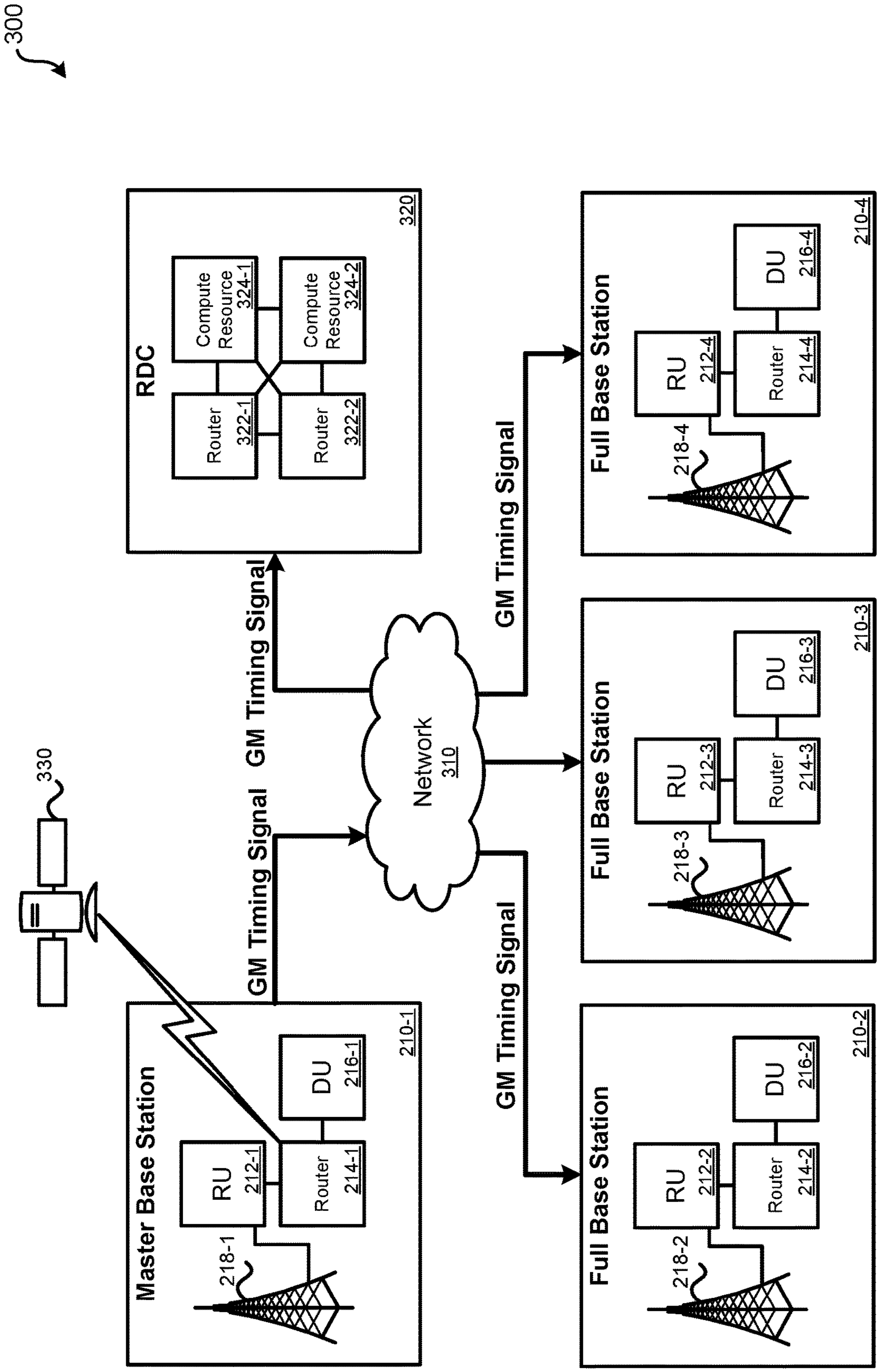
FIG. 3 illustrates an embodiment of a cellular network timing system distributing a grandmaster timing signal from a base station to other cellular network components.

FIG. 3 illustrates an embodiment of a cellular network timing system 300 ("system 300") distributing a grandmaster timing signal from a base station to other cellular network components. In system 300, full base stations are present, but no light base stations. System 300 can include: full base stations 210; network 310; regional data center 320 ("RDC 320"); and GNSS satellite 330. While FIG. 3 represents the GM timing signal being distributed to RDC 320; additionally or alternatively, the GM timing signal can be distributed to an EDC, such as EDC 237 of FIG. 2.

Each full base station may have the ability to serve as a master base station. In FIG. 3, base station 210-1 has been designated as master base station 210-1 due to it being currently assigned to generate the GM timing signal for some or all of the cellular network. Master BS 210-1 can include the same hardware as the rest of the remaining full base stations 210. Router 214-1 of master base station 210-1 can receive a GNSS signal from GNSS satellite 330. Various forms of GNSS can include global and regional variants, such as: GPS, global navigation satellite system (GLONASS), Galileo, BeiDou, quasi-zenith satellite system (QZSS), and Indian regional navigation satellite system (IRNSS). In some embodiments, satellite signals can be received from multiple satellites of the respective GNSS system.

Using the GNSS signal from GNSS satellite 330 and a local oscillator, router 214-1 can construct a highly precise timing signal that can be used as the GM timing signal. The GM timing signal that is constructed can be a precision timing protocol (PTP) synchronization message. Either the synchronization message or a later message that is sent by router 214-1 can include an accurate timestamp derived from the GNSS signal received from GNSS satellite 330.

The GM timing signal can be transmitted via network 310 to various other components of the cellular network. Master BS 210-1 can communicate directly with full BSs 210 via network 310. That is, communications from master BS 210-1 to other full BSs 210 do not need to be routed via other components of the cellular network, such as via RDC 320 or via a cellular network core.

Network 310 can represent a public and/or private network. For example, network 310 can be the same network used for VLAN connections 220. Network 310 can be a fiber-based network operated by an internet service provider (ISP).

Full BSs 210 can receive the GM timing signal from master BS 210-1 via network 310. The GM timing signal can be used to synchronize one or more local clocks at each of full BSs 210. Each of DUs 216-2, 216-3, and 216-4 can create a boundary clock that is synchronized in time, frequency, and phase based on the received GM timing signal. For each of full BSs, using roundtrip communication time between the respective full BS and master BS 210-1, a transmission delay can be determined and used to adjust the received GM timing signal. DU 216-1 may also operate a boundary clock that is synchronized in time, frequency, and phase based on the GM timing signal as received from router 214-1.

Each of DUs 216 may operate according to the locally operated boundary clock. The boundary clocks may occasionally or periodically be updated based on received GM timing signals from master BS 210-1. The router at each BS can be understood as forming a subnet. Within the subnet, the boundary clock operated by the DU acts as a master clock. Each RU may operate a slave clock that is based on timing provided by the boundary clock operated by the DU. Therefore, referring to full BS 210-1, DU 216-2 can operate a boundary clock that is synchronized based on the GM timing signals from master BS 210-1. The boundary clock is used for operation of DU 216-2. Timing signals can be output based on the boundary clock from DU 216-2 to RU 212-2. This boundary timing signal can then be used to synchronize time, phase, and frequency of a slave clock operated by RU 212-2.

A similar arrangement can be present at each full BS 210, including master BS 210-1. At master BS 210-1, a boundary clock is operated by DU 216-1, which is synchronized based on the GM timing signals from router 214-1. This boundary clock is used for operation of DU 216-1. Timing signals can be output based on this boundary clock from DU 216-1 to RU 212-1. This boundary timing signal can then be used to synchronize time, phase, and frequency of a slave clock operated by RU 212-1.

RDC 320 can be a data center or part of a data center that includes some number of computer servers and supporting equipment, such as routers. RDC 320 can be operated by the cellular network operator. RDC 320 can also base its timing on the GM timing signal created by master BS 210-1. RDC 320 can receive the GM timing signal from master BS 210-1 via network 310. Router 322-1 and/or router 322-2 may create boundary clocks based on the GM timing signal. These boundary clocks can then serve as masters for a slave clock at each of compute resources 324. Therefore, boundary clock timing signals may be transmitted from routers 322 to compute resources 324 such that the time, phase, and frequency of the slave clocks can be synchronized with the respective boundary clock.

Compute resources 324 can represent computer server systems that can perform cellular network functions. For example, various processing for the cellular network may be hosted at compute resources 324. In some embodiments, a 5G cellular network component can be hosted using compute resources 324, such as a CU.

As previously detailed, functions of the cellular network, such as the CU (e.g., CU 129) and network core (e.g., 5G core 139) can be executed on a cloud-computing platform. The timing on the cloud computing platform may be independently managed. As such, the GM timing signal output by master BS 210-1 may only be used to coordinate timing on the portion of a cellular network in a particular geographic region outside of the cloud-computing platform.

Figure 4:
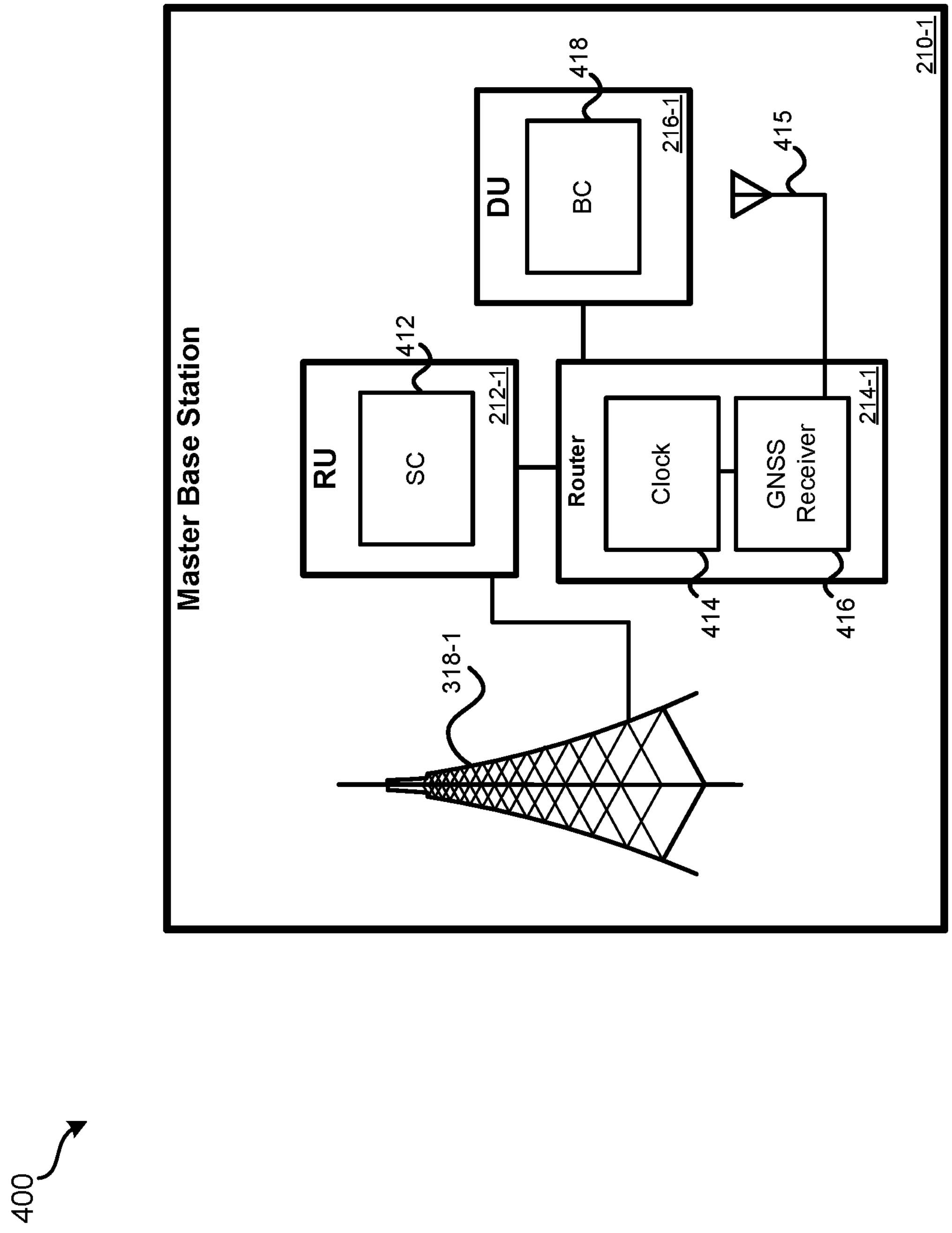
FIG. 4 illustrates an embodiment of a full base station that generates a grandmaster timing signal for other cellular network components.

FIG. 4 illustrates an embodiment 400 of full BS 210-1 that generates a GM timing signal for other cellular network components. While FIG. 4 illustrates master BS 210-1, all or many full BSs may have the hardware necessary to function as a master BS. Rather, an instruction may need to be provided to router 214-4 to activate creation and distribution of the GM timing signals. Master BS 210-1 can include: RU 212-1; router 214-1; and DU 21-1. Router 214-1 can include GNSS receiver 416 and clock 414. GNSS receiver 416 can include an integrated antenna or external antenna, collectively represented by antenna 415. DU 216-1 can include boundary clock 418 ("BC 418"). RU 212-1 can include slave clock 412.

Router 214-1 may receive a timing signal that indicates a highly precise time using GNSS receiver 416. Clock 414 serves as the GM clock for multiple cellular network components. Based on the output of clock 414 and the timing signal received by GNSS receiver 416, router 214-1 creates a PTP GM timing signal (also referred to as a GM timing message) that can be used by other components of master base station 210-1 and of the broader cellular network. The GM timing signal may be generated using one or more processors of router 214-1. The GM timing signal may be sent to DU 216-1 and transmitted to other components of the cellular network, including multiple other base stations, one or more RDCs, or both.

Using the received GM timing message, DU 216-1 may synchronize the frequency, time, and phase of BC 418. Therefore, periodically or occasionally, BC 418 is synchronized based on the GM timing messages received from router 214-1. BC 418 may be used for the timing of processes performed locally at DU 216-1. Round-trip messages may be exchanged between DU 216-1 and router 214-1 to determine an amount of delay associated with the GM timing message being transmitted.

BC 418 may be used as the master clock for synchronizing slave clock 412 of radio unit 212-1. Based upon BC 418, a PTP boundary timing signal (also referred to as a message) may be created and transmitted to RU 212-1. Using the received boundary timing message, RU 211-1 may synchronize the frequency, time, and phase of slave clock 412. Therefore, periodically or occasionally, slave clock 412 is synchronized based on the boundary timing messages received from DU 216-1 via router 214-1. Slave clock 412 may be used for the timing of processes performed locally at RU 212-1. Round-trip messages may be exchanged between DU 216-1 and RU 212-1 via router 214-1 to determine an amount of delay associated with the boundary timing message being transmitted from DU 216-1 to RU 212-1.

A full base station that is not currently functioning as the master BS may function similarly to master BS 210-1, except that the GM timing signal is not generated by its local router, but is rather received from the router of master BS 210-1. The GM timing signal as received from the master BS's router is passed by the full BS's router to the full BS's DU for use in synchronizing the DU's boundary clock. The DU's boundary clock is then used to synchronize the slave clock of the RU in the same manner as is done by the master BS.

Figure 5:
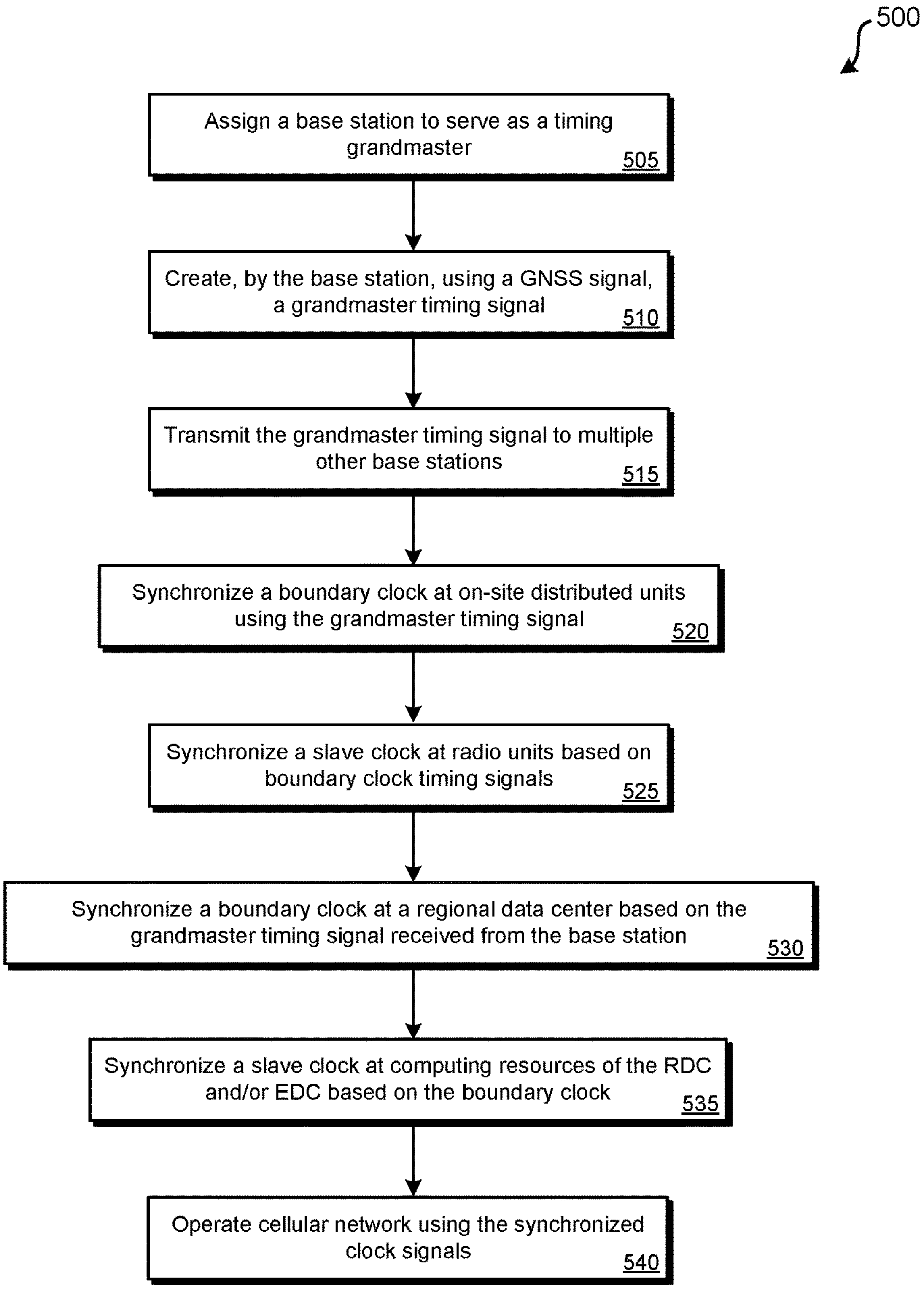
FIG. 5 illustrates an embodiment of a method for generating and distributing a grandmaster timing signal for a cellular network.

Various methods may be performed using the systems and arrangements of FIGS. 1-4. FIG. 5 illustrates an embodiment of a method 500 for generating and distributing a grandmaster timing signal for a cellular network. Method 500 may be performed using system 300 of FIG. 3 or some other system that includes at least one base station that serves as the master base station and one or more other base stations. Method 500 can be performed using a portion of a cellular network that is exclusively full base stations or is a hybrid cellular network that includes full base stations and multiple light base stations. Method 500 may be performed using a 5G New Radio (NR) cellular network that has a 5G native core.

At block 505, a full base station can be assigned to serve as a timing grandmaster. Accordingly, this full base station is referred to as a master base station. The full base station may have been manually selected, selected based on a strength of signal from a GNSS satellite, selected based on IP address (e.g., a lowest IP address may automatically be selected), randomly selected, or via some other selection process. In some embodiments, the best master clock (BMC) algorithm may be executed by a server system of the cellular network (e.g., the cloud-computing platform that executed the 5G cellular network core) to select a master base station. In other embodiments, a variation of the BMC algorithm may be used. At part of block 505, a message can be transmitted by the cellular network (e.g., by the 5G core) to the assigned master base station that triggers the assigned master base station to generate and distribute GM timing signals.

At block 510, using a local oscillator and a timing signal received from one or more GNSS satellites, the router of the master base station creates GM timing signals. These GM timing signals are distributed to multiple other cellular network components via a network. The GM timing signals can be in accordance with a PTP, such as IEEE 1588 or, more specifically, IEEE 1588v2. A component of the cellular network can provide the master base station with a listing of IP addresses (or another form of identifier) to which the GM timing signals should be distributed. In some embodiments, a different component than the router of the master BS generates the GM timing signals.

At block 515, the GM timing signal is transmitted via a network to multiple other full base stations. The GM timing signal can be received by another full BS and routed to the DU that is executed locally at each full BS. According to a PTP, roundtrip messages may be sent between the master BS and each full BS (e.g., the DU of each full BS) to establish an amount of transmission delay to correct the received GM timing signal. Notably, communication between base stations can be peer-to-peer; that is, the GM timing signals and related messages can be routed directly by the network between the master base station and each full base station, without any message relay by other cellular network components, such as a CU or 5G core.

At block 520, at each full BS, the DU may synchronize a locally executed boundary clock using the received GM timing signals. The BC may be synchronized in time, phase, and frequency based on the GM timing signals. In other embodiments, the BC maintained within the subnet of each full BS can be maintained by a different component, such as the RU.

In addition to the GM timing signal being used by other full base stations to synchronize a boundary clock, the DU of the master BS can receive GM timing signals from the router of the master BS. The DU of the master BS can also synchronize a locally executed boundary clock using the received GM timing signals. Again here, roundtrip messages may be used according to the PTP to determine the transmission delay of the GM timing signals. The BC may be synchronized in time, phase, and frequency based on the GM timing signals. In other embodiments, the BC maintained within the subnet of each full BS can be maintained by a different component, such as the RU.

At block 525, at each full BS, the RU may synchronize a locally-executed slave clock using received boundary clock-based timing signals from the local DU. Roundtrip messages may be exchanged according to the PTP to determine the transmission delay of the BC timing signals to the RU. The SC may be synchronized in time, phase, and frequency based on the BC timing signals. In other embodiments, the SC may be maintained by a different component of each full base station.

The DU of the master BS can also transmit BC timing signals locally to the RU of the master BS. The RU of the master BS can synchronize a locally executed slave clock using the received BC timing signals from the local DU. Again here, roundtrip messages may be used according to the PTP to determine the transmission delay of the BC timing signals to the RU. The SC may be synchronized in time, phase, and frequency based on the BC timing signals. In other embodiments, the SC maintained within the subnet of each full BS can be maintained by a different component, such as the DU (that is, the RU could maintain the BC and the DU could maintain the SC).

In some embodiments, in addition to clocks of other full BSs being coordinated with the master BS, one or more RDCs can have a BC and one or more SCs synchronized with the GM clock. At block 530, at one or more RDCs, a component, such as a router or switch, may synchronize a locally executed boundary clock using the received GM timing signals from the master BS. Roundtrip messages may be exchanged according to the PTP to determine the transmission delay of the GM timing signals to the router of the RDC. The BC may be synchronized in time, phase, and frequency based on the GM timing signals. In other embodiments, the BC maintained within the subnet of the RDC can be maintained by a different component.

At block 535, at each RDC, a locally executed slave clock at the various compute resources of the RDC can be synchronized using received BC timing signals from the router or switch of the RDC. Roundtrip messages may be exchanged according to the PTP to determine the transmission delay of the BC timing signals to the compute resources. The SC may be synchronized in time, phase, and frequency based on the BC timing signals. In other embodiments, the SC may be maintained by a different component of each full base station. Similar for the RDC, a boundary clock can be synchronized based on the GM timing signal and a slave clock at the computing resources of an EDC can be synchronized.

At block 540, the cellular network may be operated using the synchronized clock signals. Specifically, the full base stations may function as part of the cellular network using the locally executed BCs and SCs, which are kept synchronized with the GM clock signals received from the master BS. The one or more RDCs may function as part of the cellular network using the locally executed BCs and SCs, which are kept synchronized with the GM clock signals received from the master BS. Communications to and from the full base stations with the one or more RDCs and possibly with other components of the cellular network are synchronized using the synchronized clocks. Therefore, communications involving user equipment are timed based on the synchronized clocks.

Following the full BSs and RDC being synchronized with the GM timing signals, these components may be used to provide cellular network service to UE in a particular geographic region.

If components of the cellular network are hosted by a cloud-computing platform (e.g., a CU, a 5G core), only the regional portion of the cellular network that is connected with the cloud-computing platform may need to be synchronized. Another region of the cellular network that is connected with the cloud-computing platform may be synchronized according to a separate regional GM timing signal maintained by another master BS. Therefore, the RAN of a cellular network in a particular region can have its timing synchronized, with other portions of the RAN being separately timed.

Figure 6:
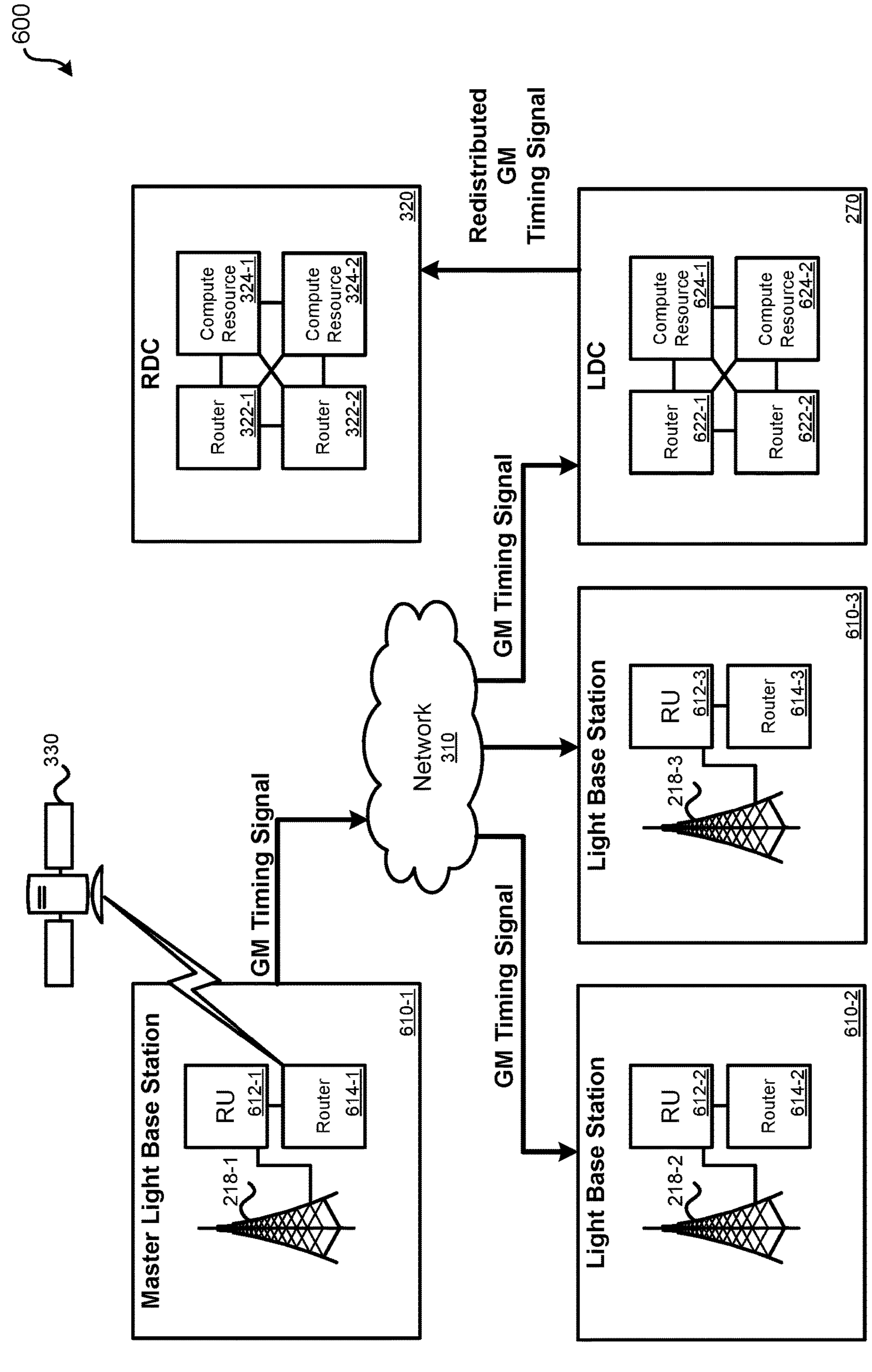
FIG. 6 illustrates an embodiment of a cellular network timing system distributing a grandmaster timing signal from a master light base station to a local data center (LDC) that hosts multiple distributed units.

In some embodiments, a light BS can generate a grandmaster timing signal and distribute that timing signal to other light (and, possibly, full) base stations and network components, such as the LDC. The LDC may then relay the grandmaster timing signal to an RDC. Using the grandmaster timing signal, other light base stations and other network components can synchronize a boundary clock, which in turn can be used to synchronize one or more slave clocks. FIG. 6 illustrates an embodiment of a cellular network timing system 600 ("system 600") that distributes a grandmaster timing signal from a master light base station to an LDC that hosts multiple distributed units, which then redistributes the GM timing signal to an RDC. System 600 can include: light BSs 610; network 310; LDC 270; RDC 320; and GNSS satellite 330. While FIG. 6 represents the GM timing signal being distributed to LDC 620 and RDC 320; additionally or alternatively, the GM timing signal can be distributed to an EDC, such as EDC 237 of FIG. 2.

Notably, for each of light BS 610, no DU is present at the light BSs. Rather, LDC 620, using compute resources 624, hosts multiple instances of DUs. Since three light BSs (610-1, 610-2, 610-3) are present in FIG. 3, LDC 270 uses compute resources 624 to host at least three DU instances, with each DU instance corresponding to a particular light BS. Compute resources 324-1 and 324-2 can represent redundant server systems that allow for execution of software that functions as the multiple DU instances. Therefore, compute resources 324 function as DU host server system 225 of FIG. 2 and DUs 227 are executed by compute resources 324. As illustrated in FIG. 2, in addition to being able to communicate via network 310, a direct connection, such as a direct fiber link can be used for communication between a light BS and LDC 270.

Each light base station of light BSs 610 may have the ability to serve as a master light base station. In FIG. 6, light BS 610-1 has been designated as master light base station 610-1 due to it being currently assigned to generate the GM timing signal for some or all of the cellular network. Master light BS 610-1 can include the same hardware as the rest of the remaining light BSs 610. Router 614-1 of master light base station 610-1 can receive a GNSS signal from GNSS satellite 330. Various forms of GNSS can include global and regional variants, such as: GPS, global navigation satellite system (GLONASS), Galileo, BeiDou, quasi-zenith satellite system (QZSS), and Indian regional navigation satellite system (IRNSS). In some embodiments, satellite signals can be received from multiple satellites of the respective GNSS system.

Using the GNSS signal from GNSS satellite 330 and a local oscillator, router 614-1 can construct a highly precise timing signal that can be used as the GM timing signal. The GM timing signal that is constructed can be a precision timing protocol (PTP) synchronization message. Either the synchronization message or a later message that is sent by router 614-1 can include an accurate timestamp derived from the GNSS signal received from GNSS satellite 330.

The GM timing signal can be transmitted via network 310 to various other components of the cellular network. Master light BS 610-1 can communicate directly with light BSs 610 via network 310. That is, communications from master light BS 610-1 to other light BSs 610 do not need to be routed via other components of the cellular network, such as via LDC 270, RDC 320, or via a cellular network core.

Network 310 can represent a public and/or private network. For example, network 310 can be the same network used for VLAN connections 220. Network 310 can be a fiber-based network operated by an internet service provider (ISP). A sufficient amount of bandwidth may be reserved on network 310 for uplink and downlink communications between LDC 270 and light base stations 610.

Light BSs 610 can receive the GM timing signal from master light BS 610-1 via network 310. The GM timing signal can be used to synchronize one or more local clocks at each of light BSs 610. Router 614-2 and router 614-3 can synchronize a boundary clock in time, frequency, and phase based on the received GM timing signal. For each of light BSs 610-2 and 610-3, using roundtrip communication time between the respective light BS and master light BS 610-1, a transmission delay can be determined and used to adjust the received GM timing signal.

Each of RUs 212 may have a slave clock that is synchronized according to the boundary clock of the on-site router of routers 214. The boundary clocks maintained by router 214-2 and router 214-3 occasionally or periodically be updated based on received GM timing signals from router 614-1 of master light BS 610-1. The router at each light BS can be understood as forming a subnet. Within the subnet, the boundary clock operated by each router acts as a master clock. Each RU (612-1, 612-2, 612-3) may operate a slave clock that is based on timing provided by the boundary clock operated by the respective router (or, in the case of master light BS 610-1, the slave clock of RU 612-1 is synchronized directed based on the GM timing signal generated by router 614-1). Referring to light BS 612-2, boundary clock timing signals can be output based on the boundary clock from router 614-2 to RU 612-2. This boundary timing signal can then be used to synchronize time, phase, and frequency of the slave clock operated by RU 612-2.

In addition to the GM timing signal being output by master light BS 610-1 to other light BSs of light BSs 610, the GM timing signal may be transmitted to LDC 270. A router of LDC 270, such as router 622-1, can synchronize a boundary clock based on the GM timing signal from master light BS 610-1. The GM timing signal can be redistributed from LDC 270 to RDC 320. The redistributed GM timing signal can then be used by RDC 320 to synchronize a boundary clock maintained by a router, such as router 322-1.

At LDC 270 and RDC 320, multiple slave clocks may be synchronized based on the synchronized boundary clocks. At LDC 270, a slave clock can be maintained by router 622-2, compute resource 624-1, and compute resource 624-2. These slave clocks may be synchronized in time, phase, and frequency based on boundary timing signals generated based on the synchronized boundary clock maintained by router 622-1. At RDC 320, a slave clock can be maintained by router 322-2, compute resource 324-1, and compute resource 324-2. These slave clocks may be synchronized in time, phase, and frequency based on boundary timing signals generated based on the synchronized boundary clock maintained by router 322-1.

As illustrated, only three light BSs 610 are present that have DUs hosted by LDC 270. In other embodiments, fewer or greater numbers of lights BSs 610 may be present. For example, LDC 270 may host four to ten DUs for corresponding light BSs. Further, the number of routers and compute resources at LDC 270 and RDC 320 can vary by embodiment. For example, if a larger number of DUs are present at LDC 270, a larger number of compute resources 624 (e.g., servers) may be needed. In some embodiments, the GM timing signal can be distributed by a master light BS to one or more full BSs and one or more light BSs. A hybrid arrangement can be present in which either a master light BS or a master full BS distributes a GM timing signal to one or more full BSs or one or more light BSs, respectively.

Figure 7:
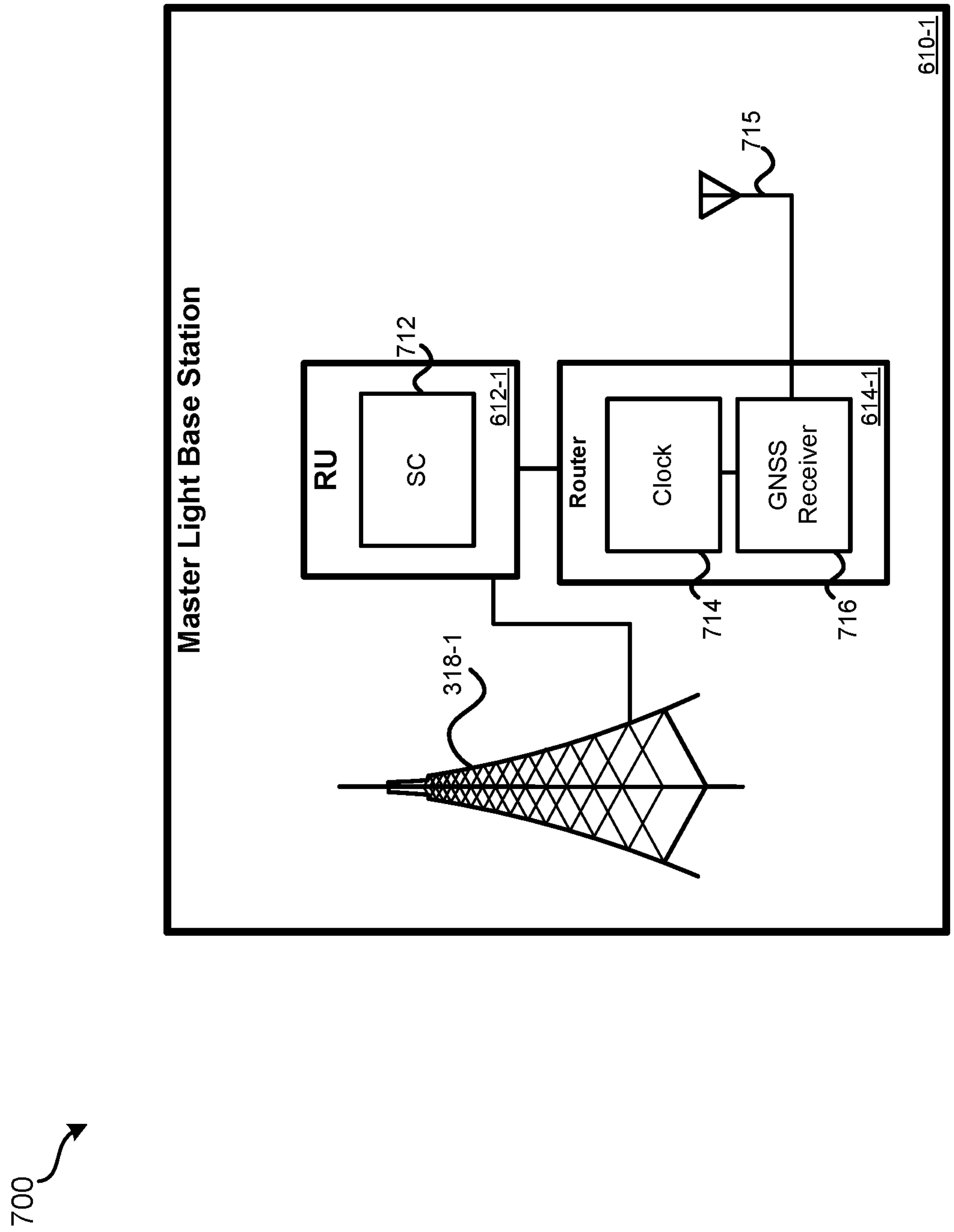
FIG. 7 illustrates an embodiment of a light base station that generates a grandmaster timing signal for other cellular network components.

FIG. 7 illustrates an embodiment of a light base station 700 that generates a GM timing signal for other cellular network components (e.g., other light BSs, full BSs, LDC, RDC). While FIG. 7 illustrates master light BS 610-1, all or many lights BSs may have the hardware necessary to function as a master light BS. An instruction may need to be provided to router 614-1 to activate creation and distribution of the GM timing signals. Master BS 610-1 can include: RU 612-1 and router 614-1. No DU is present at a light BS. Router 614-1 can include GNSS receiver 716 and clock 714. GNSS receiver 716 can include an integrated antenna or external antenna, collectively represented by antenna 715.

Router 614-1 may receive a timing signal that indicates a highly precise time using GNSS receiver 716. Clock 714, which is synchronized based on the timing signal from GNSS receiver 716, serves as the GM clock for multiple cellular network components. Based on the output of clock 714 and the timing signal received by GNSS receiver 716, router 614-1 creates a PTP GM timing signal (also referred to as a GM timing message) that can be used by RU 612-1 and other components of the broader cellular network. The GM timing signal may be generated using one or more processors of router 614-1. The GM timing signal may be sent to RU 612-1 to synchronize slave clock 712 and transmitted to other components of the cellular network, including multiple other light or full base stations, an LDC, and/or one or more RDCs.

Using the received GM timing message, RU 612-1 may synchronize the frequency, time, and phase of SC 712. Therefore, periodically or occasionally, SC 712 is synchronized based on the GM timing messages received from router 614-1. Round-trip messages may be exchanged between RU 612-1 and router 614-1 to determine an amount of delay associated with the GM timing message being transmitted.

A light BS that is not currently functioning as the master light BS may function similarly to master light BS 610-1, except that the GM timing signal is not generated by its local router, but is rather received from the router of master BS 610-1. The GM timing signal as received from the master BS's router is used to synchronize a boundary clock maintained by the router of the light BS. The router's boundary clock is then used to synchronize the slave clock of the RU in the same manner as is done by the master BS.

Figure 8:
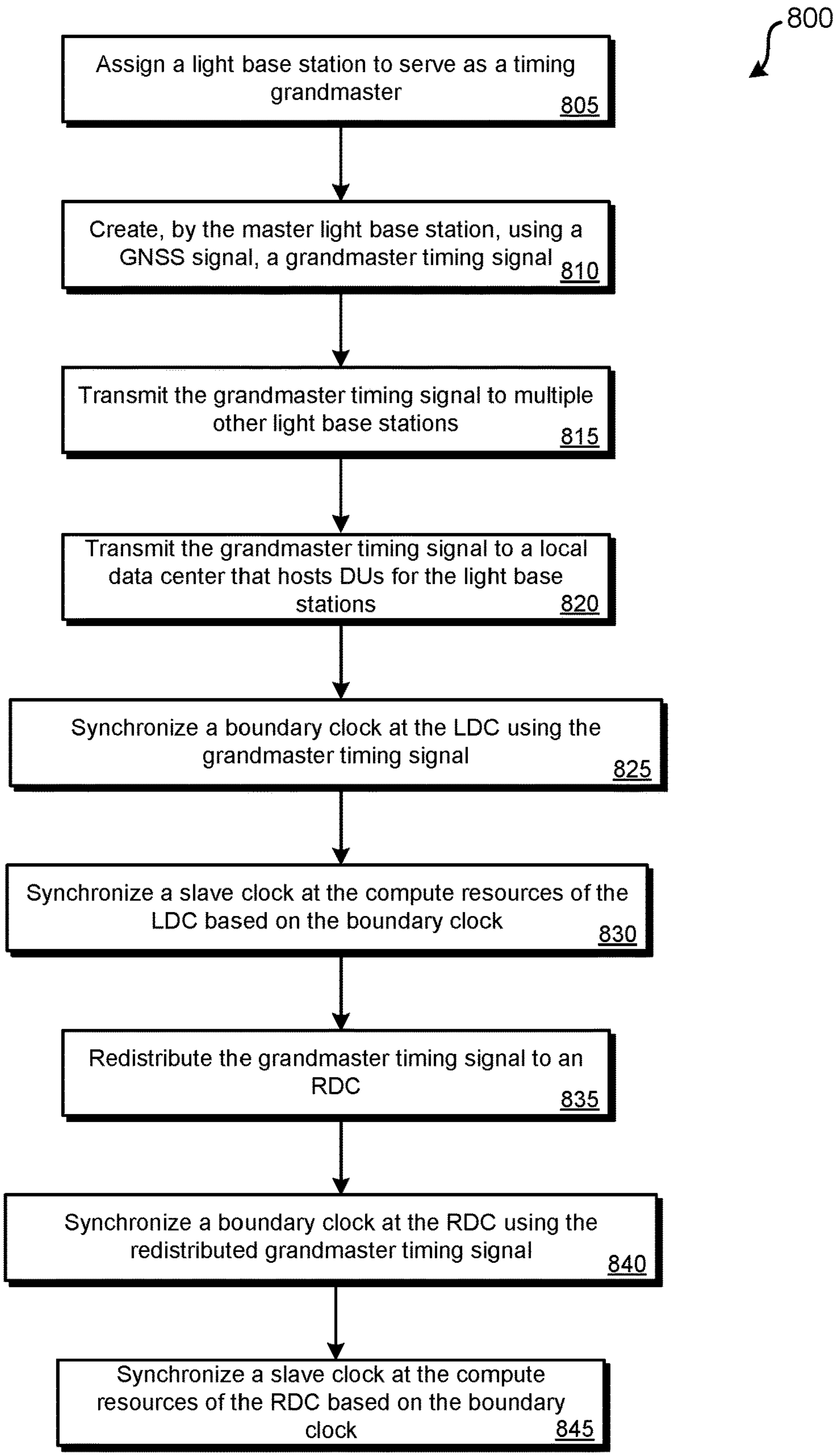
FIG. 8 illustrates an embodiment of a method for generating and distributing a grandmaster timing signal using a light base station for a cellular network.

Various methods may be performed using the systems and devices of FIGS. 1A, 1B, 2, 6 and 7. FIG. 8 illustrates an embodiment of a method 800 for generating and distributing a grandmaster timing signal using a light base station of a cellular network. Method 800 may be performed using system 600 of FIG. 6 or some other system that includes a light base station that serves as the master base station and one or more other light base stations. Method 800 can be performed using a portion of a cellular network that is exclusively light base stations or is a hybrid cellular network that includes full base stations and multiple light base stations. Method 800 may be performed using a 5G New Radio (NR) cellular network that has a 5G native core.

At block 805, a light base station can be assigned to serve as a timing grandmaster. Accordingly, this light base station is referred to as a master light BS. The master light BS may have been manually selected, selected based on a strength of signal from a GNSS satellite, selected based on IP address (e.g., a lowest IP address may automatically be selected), randomly selected, or via some other selection process. In some embodiments, the best master clock (BMC) algorithm may be executed by a server system of the cellular network (e.g., the cloud-computing platform that executed the 5G cellular network core) to select a master light BS. In other embodiments, a variation of the BMC algorithm may be used. At part of block 805, a message can be transmitted by the cellular network (e.g., by the 5G core) to the assigned master light BS that triggers the assigned master light BS to generate and distribute GM timing signals.

At block 810, using a local oscillator and a timing signal received from one or more GNSS satellites, the router of the master light BS creates GM timing signals. These GM timing signals are distributed to multiple other cellular network components via a network. The GM timing signals can be in accordance with a PTP, such as IEEE 1588 or, more specifically, IEEE 1588v2. A component of the cellular network can provide the master BS with a listing of IP addresses (or another form of identifier) to which the GM timing signals should be distributed. In some embodiments, a different component than the router of the master light BS generates the GM timing signals.

At block 815, the GM timing signal is transmitted via a network to multiple other light BSs. The GM timing signal can be received by another light BS and used by the router of the light BS to synchronize a boundary clock. According to a PTP, roundtrip messages may be sent between the master light BS and each light BS (e.g., the router of each light BS) to establish an amount of transmission delay to correct the received GM timing signal. Notably, communication between base stations can be peer-to-peer; that is, the GM timing signals and related messages can be routed directly by the network between the master light base station and each light base station, without any message relay by other cellular network components, such as a CU or 5G core.

At block 820, the GM timing signal is transmitted via the network to an LDC that hosts DUs for the master light BS and at least some other light BSs to which the GM timing signal is distributed. At block 825, the GM timing signal is used by the LDC to synchronize a boundary clock maintained by the LDC. The boundary clock may be maintained by a router of the LDC. At block 830, one or more slave clocks maintained by other components of the LDC, such as one or more additional routers and one or more compute resources, can be synchronized based on boundary clock timing signals generated based on the synchronized boundary clock of the LDC.

At block 835, the GM timing signal received by the LDC from the master light BS can be redistributed to an RDC. This redistribution may happen via a dedicated communication connection between the LDC and RDC or via a network. At block 840, the redistributed GM timing signal is used by the RDC to synchronize a boundary clock maintained by the RDC. The boundary clock may be maintained by a router of the RDC. At block 845, one or more slave clocks maintained by other components of the RDC, such as one or more additional routers and one or more compute resources, can be synchronized based on boundary clock timing signals generated based on the synchronized boundary clock of the LDC.

Following the light BSs, LDC, and RDC being synchronized with the GM timing signals, these components may be used to provide cellular network service to UE in a particular geographic region.

If components of the cellular network are hosted by a cloud-computing platform (e.g., a CU, a 5G core), only the regional portion of the cellular network that is connected with the cloud-computing platform may need to be synchronized. Another region of the cellular network that is connected with the cloud-computing platform may be synchronized according to a separate regional GM timing signal maintained by another master BS. Therefore, the RAN of a cellular network in a particular region can have its timing synchronized, with other portions of the RAN being separately timed.

After a BS, be it a light BS or full BS, has functioned as the master BS and provided the GM timing signal to other BSs and other cellular network components for a time, a situation can arise where the master BS can no longer effectively generate and distribute the GM timing signal. For example, the GNSS signal may be lost, the router of the master BS may have been reset, a power outage may have occurred, etc. In order for the cellular network to continue functioning correctly, another BS is required to begin serving as the master BS.

Figure 9:
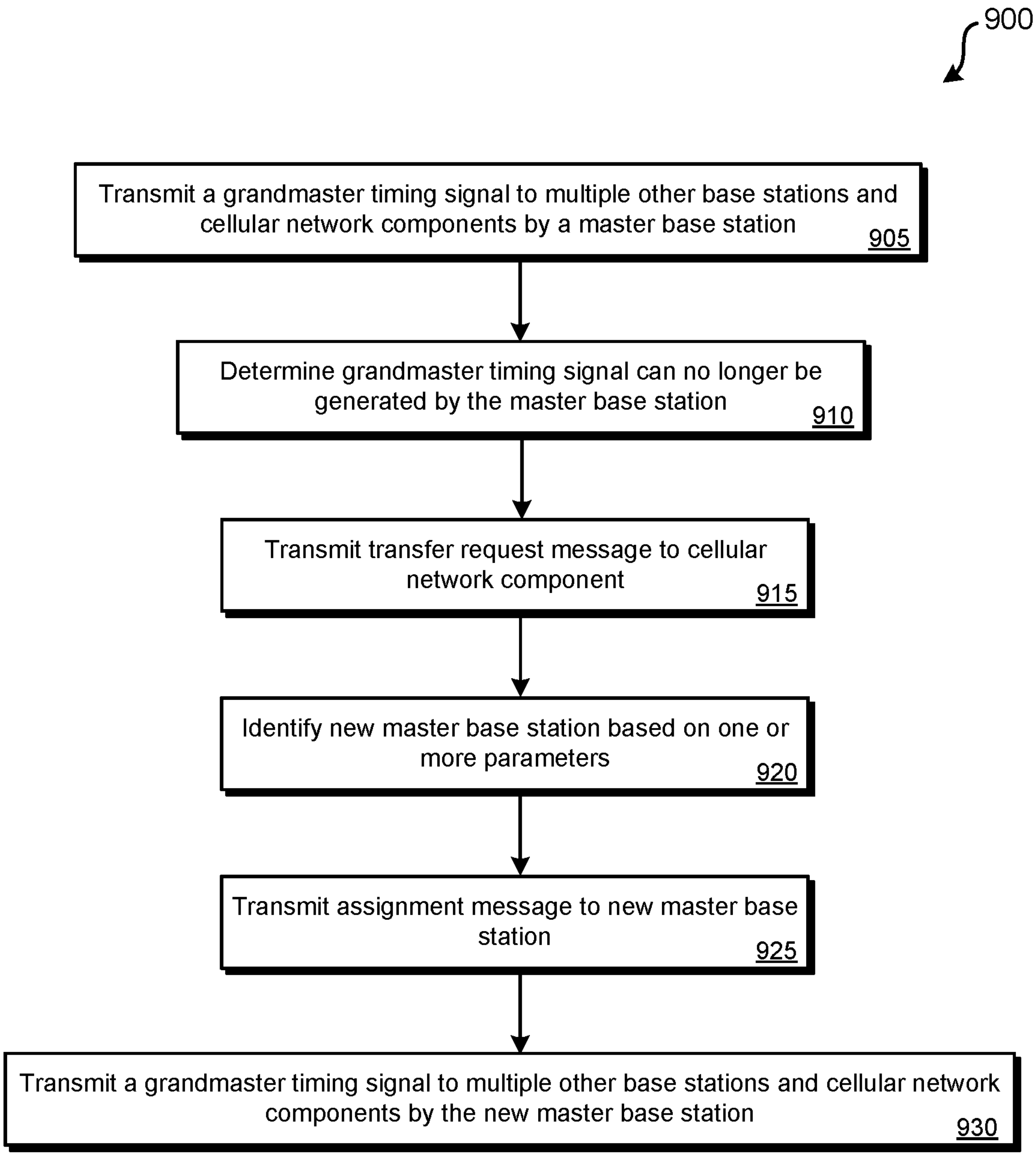
FIG. 9 illustrates an embodiment of a method for handing off generation of the GM timing signal between BSs.

FIG. 9 illustrates an embodiment of a method 900 for handing off generation of the GM timing signal between BSs. Method 900 can be performed using the systems of FIGS. 1A-4 and 6. At block 905, a GM timing signal may be generated by a master BS (e.g., by a router of the master BS) and distributed to other BSs and other cellular network components. Block 905 can involve blocks of method 500 or blocks of method 800 being performed involving a master full BS or a master light BS. It may be beneficial to maintain the same master BS as long as possible; therefore, as long as the master BS is functioning properly, it may remain the master BS.

However, at some time, a determination may be made at block 910 that the master BS is no longer eligible to serve, at least temporarily, as the master BS. This determination can be made by the master BS itself. For example, the master BS may detect that the signal strength of the GNSS signal has dropped below a signal strength threshold or that greater than a threshold number of GNSS signals have been failed to be successfully received. As another example, the master BS may determine that it is operating on a backup power supply. There are many additional reasons as to why a particular BS may no longer be eligible to serve as the master BS. For example, due to a fiber cut or network problems, insufficient bandwidth may be available between the master BS and other cellular network components.

In some embodiments, the determination of block 910 is made by another component of the cellular network. In system 300, RDC 320 may monitor how frequently the GM timing signal is received from master BS 210-1. If a predefined period of time elapses during which a GM timing signal is not received from master BS 210-1, RDC 320 may be configured to assign another BS to function as the master BS. In system 600, LDC 270 may monitor how frequently the GM timing signal is received from master light BS 610-1. If a predefined period of time elapses during which a GM timing signal is not received from master light BS 610-1, LDC 270 may be configured to assign another BS to function as the master BS.

In some embodiments, if the master BS determines that it can no longer serve as the master BS, it can transmit a transfer request message at block 915 to the cellular network component that manages which BS is assigned as the master (e.g., the RDC or LDC). Alternatively, if the RDC or LDC makes the determination that master BS assignment needs to be changed, the transfer request message of block 915 may be sent by the RDC or LDC to the current master BS, triggering the master BS to no longer output GM timing signals to other base stations and cellular network components.

At block 920, a different BS can be identified to serve as the new master BS. One or more parameters may be used to make this identification. In some embodiments, an identifier or IP address may be used to make the selection (e.g., the next greater identifier). In some embodiments, messages with other BSs may be exchanged to determine which BS has a best signal strength from a GNSS satellite. In some embodiments, an average communication time to other base stations may be used to select the BS with the lowest average time. In some embodiments, a predefined ranking of BSs may be used. The predefined ranking may be based on BSs that are expected to have a best line-of-sight to GNSS satellites. In some embodiments, the selection of another BS may be random or partially random.

The selection of block 920 can be made in response to block 910 or may be performed while the previous master BS is still functioning as the master. If the latter, the selection of block 920 may serve as a designation that is only activated if and when block 910 occurs. That is, a selection of one (or more) backup master BSs may be performed such that if the BS serving as the master needs to be reassigned at block 910, it has been predetermined which BS will begin serving as the master BS.

At block 925, an assignment message can be transmitted to the BS that has been assigned to function as the master BS at block 920. Block 925 can be triggered to be performed in response to block 925 or in response to block 910. The message can indicate that the BS is to begin functioning as the master BS. This message can trigger the BS to begin generating a GM timing signal or to activate use of a GM timing signal that is has been generating. Generation of the GM timing signal may be performed based on a local oscillator and GNSS signals received from one or more GNSS satellites by the router of the BS.

The message of block 925, or a separate message(s), may be transmitted to the now-master BS that indicates identifiers (e.g., IP addresses) of BSs and other cellular network components that are to receive the GM timing signal.

At block 930, a GM timing signal may now be generated by the master BS identified at block 920. The GM timing signal can then be distributed to other BSs (including the BS that served as the master at block 905) and other cellular network components. Block 930 can involve blocks of method 500 or blocks of method 800 being performed involving a master full BS or a master light BS. Method 900 can be repeated as frequently as necessary to ensure a reliable and accurate GM timing signal is distributed among cellular network components.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A cellular network timing system, comprising:
a plurality of base stations; and
a master base station, comprising:
a radio unit (RU);
a distributed unit (DU), wherein a central unit (CU), which is in communication with the DU, is hosted by a cloud computing platform remote from the master base station; and
a router in communication with the RU, the DU, and a network, wherein the router comprises a global navigation satellite system (GNSS) receiver, the router being configured to:
generate a grandmaster timing signal based on a signal received by the GNSS receiver and a clock signal of a local oscillator;
transmit the grandmaster timing signal to the distributed unit; and
transmit, via the network, the grandmaster timing signal to each base station of the plurality of base stations.

2. The cellular network timing system of claim 1, wherein the DU is configured to synchronize a boundary clock using the grandmaster timing signal created by the router at the master base station.

3. The cellular network timing system of claim 2, wherein the DU is executed on a computer server system that is part of the master base station.

4. The cellular network timing system of claim 2, wherein the RU is configured to synchronize a slave clock based on a boundary clock timing signal received from the DU of the master base station.

5. The cellular network timing system of claim 1, further comprising:
a regional data center (RDC) in communication with the plurality of base stations and the master base station via the network, wherein the router of the master base station is further configured to transmit, via the network, the grandmaster timing signal to the RDC.

6. The cellular network timing system of claim 5, wherein the RDC is configured to synchronize a RDC boundary clock using the grandmaster timing signal received from the master base station.

7. The cellular network timing system of claim 1, wherein the master base station transmits the grandmaster timing signal to the plurality of base stations directly via the network such that no other cellular network components relay the grandmaster timing signal between the master base station and the plurality of base stations.

8. The cellular network timing system of claim 1, wherein each base station of the plurality of base stations synchronizes a local boundary clock using the grandmaster timing signal received from the master base station via the network.

9. The cellular network timing system of claim 8, wherein the grandmaster timing signal is used to coordinate time, frequency, and phase for the plurality of base stations.

10. The cellular network timing system of claim 1, wherein the master base station and the plurality of base stations are part of a 5G New Radio (NR) cellular network.

11. A method for generating and distributing a grandmaster timing signal for a cellular network, the method comprising:

generating, by a router located on-site at a base station, a grandmaster timing signal based on a signal received by a GNSS receiver of the base station and a clock signal of a local oscillator of the base station, wherein:

the base station comprises a distributed unit (DU), the router, and a radio unit RU) and a central unit (CU), which is in communication with the DU, is remotely hosted on a cloud computing platform that is remote the base station;

transmitting the grandmaster timing signal to the DU of the base station; and transmitting, via a network, the grandmaster timing signal to each base station of a plurality of base stations of the cellular network.

12. The method for generating and distributing the grandmaster timing signal for the cellular network of claim 11, wherein the grandmaster timing signal is generated by a router of the base station, the router being communicatively coupled with a radio unit (RU) and the DU of the base station.

13. The method for generating and distributing the grandmaster timing signal for the cellular network of claim 12, further comprising:

synchronizing, by the DU, a boundary clock of the DU using the grandmaster timing signal.

14. The method for generating and distributing the grandmaster timing signal for the cellular network of claim 13, wherein the DU is executed on a computer server system that is part of the base station.

15. The method for generating and distributing the grandmaster timing signal for the cellular network of claim 14, further comprising:

synchronizing, by the RU of the base station, a slave clock based on a boundary clock timing signal received from the DU.

16. The method for generating and distributing the grandmaster timing signal for the cellular network of claim 11, further comprising:

receiving, by a regional data center (RDC) executed on a cloud-computing platform, the grandmaster timing signal from the base station.

17. The method for generating and distributing the grandmaster timing signal for the cellular network of claim 16, further comprising:

synchronizing, by the RDC, an RDC boundary clock using the grandmaster timing signal received from the base station.

18. The method for generating and distributing the grandmaster timing signal for the cellular network of claim 11, wherein the base station transmits the grandmaster timing signal to the plurality of base stations directly via the network such that no other cellular network components relay the grandmaster timing signal between the base station and the plurality of base stations.

19. The method for generating and distributing the grandmaster timing signal for the cellular network of claim 18, further comprising:

synchronizing, by each base station of the plurality of base stations, a local boundary clock using the grandmaster timing signal received from the base station via the network.

20. The method for generating and distributing the grandmaster timing signal for the cellular network of claim 19, wherein the grandmaster timing signal is used to coordinate time, frequency, and phase for the plurality of base stations.

* * * * *